(12) United States Patent
Sud et al.

(10) Patent No.: US 8,803,883 B2
(45) Date of Patent: Aug. 12, 2014

(54) GENERATING VORONOI TREEMAPS

(75) Inventors: Avneesh Sud, Kirkland, WA (US); Danyel Fisher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 12/474,277

(22) Filed: May 29, 2009

(65) Prior Publication Data

US 2010/0302279 A1 Dec. 2, 2010

(51) Int. Cl.
*G06T 11/20* (2006.01)
*G09G 5/02* (2006.01)
*G09G 5/00* (2006.01)

(52) U.S. Cl.
USPC ............ 345/440; 345/441; 345/595; 345/660

(58) Field of Classification Search
CPC ................ G06T 7/0081; G06T 7/0093; G06T 2207/20141; G06T 17/20; G06T 2219/2021; G06T 7/60; G06T 17/005; G06T 2207/20156; G06T 2207/20161; G06T 2207/30172; G06T 11/203; G06T 17/205; G06T 2215/06; G06T 9/001; G06T 9/20
See application file for complete search history.

(56) References Cited

U.S. PATENT DOCUMENTS

| | | | |
|---|---|---|---|
| 5,734,368 A | | 3/1998 | Meyers et al. |
| 6,133,921 A | | 10/2000 | Turkiyyah et al. |
| 2004/0168115 A1 | * | 8/2004 | Bauernschmidt et al. .... 715/500 |
| 2008/0181469 A1 | | 7/2008 | Kim |

OTHER PUBLICATIONS

Michael Balzer and Oliver Deussen, "Voronoi Treemaps", IEEE Symposium on Information Visualization (InfoVis 2005), pp. 7-14, 2005.*
Michael balzer, Oliver Deussen, and Claus Lewerentz, "Voronoi Treemaps for the Visualization of Software Metrics", in ACM SoftVis '05, New York, NY, USA: ACM, 2005, pp. 165-172.*
Ian Fischer and Craig Gotsman, "Fast Approximation of High Order Voronoi Diagrams and Distance Transforms on the GPU", Journal of Graphics Tools, vol. 11, No. 4, 2006, pp. 39-60.*
Igor Majdandzic, Christian Trefftz and Gregory Wolffe, "Computation of Voronoi Diagrams Using a Graphics Processing Unit", IEEE International Conference on Electo/Information Technology 2008, EIT 2008, May 18-20, 2008, pp. 437-441.*
Bart G. Farkas, "The Nintendo Wii Pocket Guide", Apr. 10, 2007, Peachpit Press.*
Foley et al., "Computer Graphics: Principles and Practice: Second Edition in C", Section 5.1 to 5.4, pp. 201-213, Reprinted with corrections, Jul. 1997.*
Tu et al., "Visualizing Changes of Hierarchical Data using Treemaps", IEEE Transactions on Visualization and Computer Graphics, vol. 13, No. 6, pp. 1286-1293, Nov./Dec. 2007.*

(Continued)

*Primary Examiner* — Kee M Tung
*Assistant Examiner* — Sing-Wai Wu
(74) *Attorney, Agent, or Firm* — Dan Choi; Carole Boelitz; Micky Minhas

(57) ABSTRACT

A system described herein includes a receiver component that receives a tree-structured dataset that includes multiple branches that are hierarchically related to one another. The system also includes an executor component that causes a programmable graphical processing unit to generate a Voronoi treemap based at least in part upon the tree-structured dataset, wherein the Voronoi treemap comprises a plurality of subareas that correspond to the multiple branches, and wherein the Voronoi treemap represents hierarchical relationships between the multiple branches.

20 Claims, 9 Drawing Sheets

(56) References Cited

OTHER PUBLICATIONS

Pang et al., "Development of a Process-Based Model for Dynamic Interaction in Spatio-Temporal GIS", Kluwer Academic Publishers. GeoInformatica 6:4, 323-344, 2002.*

Vliegen et al., "Visualizing Business Data with Generalized Treemaps", IEEE Transactions on Visualization and Computer Graphics, vol. 12, No. 5, pp. 789-796, Sep./Oct. 2006.*

Majdandzic, et al., "Computation of Voronoi Diagrams using a Graphics Processing Unit", IEEE International Conference on Electro/Information Technology, Retrieved at <<http://ieeexplore.ieee.org/stamp/stamp.jsp?arnumber=04554342>>, May 18-20, 2008, pp. 437-441.

Rong, et al., "Jump Flooding in GPU with Applications to Voronoi Diagram and Distance Transform", Proceedings of the 2006 symposium on Interactive 3D graphics and games, Retrieved at <<http://www.comp.nus.edu.sg/~tants/jfa/i3d06.pdf>>, Mar. 14-17, 2006, pp. 8.

Hoff III, et al., "Interactive Motion Planning Using Hardware-Accelerated Computation of Generalized Voronoi Diagrams", Proceedings of the 2000 IEEE International Conference on Robotics & Automation, Retrieved at <<http://ieeexplore.ieee.org//stamp/stamp.jsp?tp=&arnumber=00846473>>, Apr. 2000, pp. 2931-2937.

Du, et al., "Centroidal Voronoi Tessellations: Applications and Algorithms", Society for Industrial and Applied Mathematics Review, Retrieved at <<http://www.math.psu.edu/qdu/Res/Pre/dfg99sirv.pdf>>, vol. 41, No. 4, Mar. 3, 1999, pp. 637-676.

Fort, et al., "Computing Distance Functions from Generalized Sources on Weighted Polyhedral Surfaces", International Conference on Computational Sciences and Its Applications, Retrieved at <<http://ieeexplore.ieee.org/stamp/stamp.jsp?arnumber=04561244>>, Jul. 3-5, 2006, pp. 394-404.

Fischer, et al., "Fast Approximation of High Order Voronoi Diagrams and Distance Transforms on the GPU", Retrieved at <<http://www.cs.technion.ac.il/~gotsman/AmendedPubl/Fischer/voronoi.pdf>>, vol. 11, No. 4, 2006, pp. 1-16.

\* cited by examiner

GENERATING VORONOI TREEMAPS

BACKGROUND

As technologies pertaining to computing have advanced in recent years, an amount of data that can be stored and analyzed has increased exponentially. For example, personal computers are currently equipped with hard drives that have storage capacity on the order of multiple terabytes. Thus, an individual utilizing a personal computer can store millions of documents, spreadsheets, images, amongst other types of data.

When a large amount of related data is accumulated, determining how portions of the related data correspond to other portions of the related data can become quite difficult. Visualization mechanisms have been adapted to present an individual or set of individuals with a visual depiction of how portions of data relate to each other. In an example, a mechanism referred to as a treemap has been used to present a visual depiction of a hierarchical arrangement of data to an individual or set of individuals.

Historically, treemaps are a mechanism to graphically depict tree-structured (hierarchical) data utilizing nested rectangles. Specifically, each branch of a tree is given a rectangle that is proportional in size to a dimension of the underlying data. A rectangle may be tiled with additional rectangles to illustrate sub-branches of a particular branch. Thus, by reviewing a treemap, an individual or set of individuals can easily ascertain how a set of data is structured and can infer relationships amongst the data.

While treemaps are useful in visually depicting tree-structured data, they are generally viewed as being somewhat inflexible. For example, altering a size of a rectangle that represents the source node of tree-structured data may cause a resulting treemap to become visually unappealing (e.g., rectangles representing branches of the data may be resized as very thin rectangles that provide little to no meaning to a reviewer of the treemap). Accordingly, a visualization mechanism entitled a Voronoi treemap has been utilized to overcome such deficiency.

Voronoi treemaps have similar characteristics to treemaps in that Voronoi treemaps can represent tree-structured data, wherein size of subareas in a Voronoi treemap is proportional to a dimension of underlying tree-structured data. Voronoi treemaps, however, lack constraints that are associated with conventional treemaps. Specifically, portions of Voronoi treemaps may be or include any suitable shape (while maintaining a desired aspect ratio between height and width of shapes), and need not be rectangular in nature. While Voronoi treemaps allow areas to be resized, zoomed in upon, and/or moved, generating a Voronoi treemap requires a significant amount of processing time.

SUMMARY

The following is a brief summary of subject matter that is described in greater detail herein. This summary is not intended to be limiting as to the scope of the claims.

Described herein are various technologies pertaining to generating Voronoi treemaps. When generating Voronoi treemaps, various constraints/optimization criteria can be observed. For example, a Voronoi treemap may have a bounding area of any suitable shape, and division of subareas in the bounding area can fully utilize the bounding area to avoid holes and overlappings. Additionally, subareas in the bounding area can have an overall aspect ratio between width and height that converges to a desired number (e.g., one). Moreover, siblings in the tree-structured data may not be grouped during the layout process, thereby causing identification of the hierarchical structure to be non-ambiguous. Still further, subareas of the Voronoi treemap can have non-regular shapes, such that edges between subareas do not seemingly run into one another.

When generating a Voronoi treemap, a tree-structured dataset can be received. For example, the tree-structured dataset may include any suitable data, including hierarchically-related data pertaining to an organization, data that indicates a number of individuals playing certain games at various points in time, etc. A programmable graphical processing unit may then be employed in connection with generating a Voronoi treemap based at least in part upon the tree-structured dataset. The Voronoi treemap may be displayed on a display screen of any suitable computing device.

Capabilities of a programmable graphical processing unit to perform parallel computing can be leveraged to significantly reduce an amount of processing time required to generate a Voronoi treemap. Further, the programmable graphical processing unit can be employed in connection with determining a location for a portion of a Voronoi treemap unambiguously at a pixel-level, rather than ambiguously.

Other aspects will be appreciated upon reading and understanding the attached figures and description.

DETAILED DESCRIPTION

Figure 1:
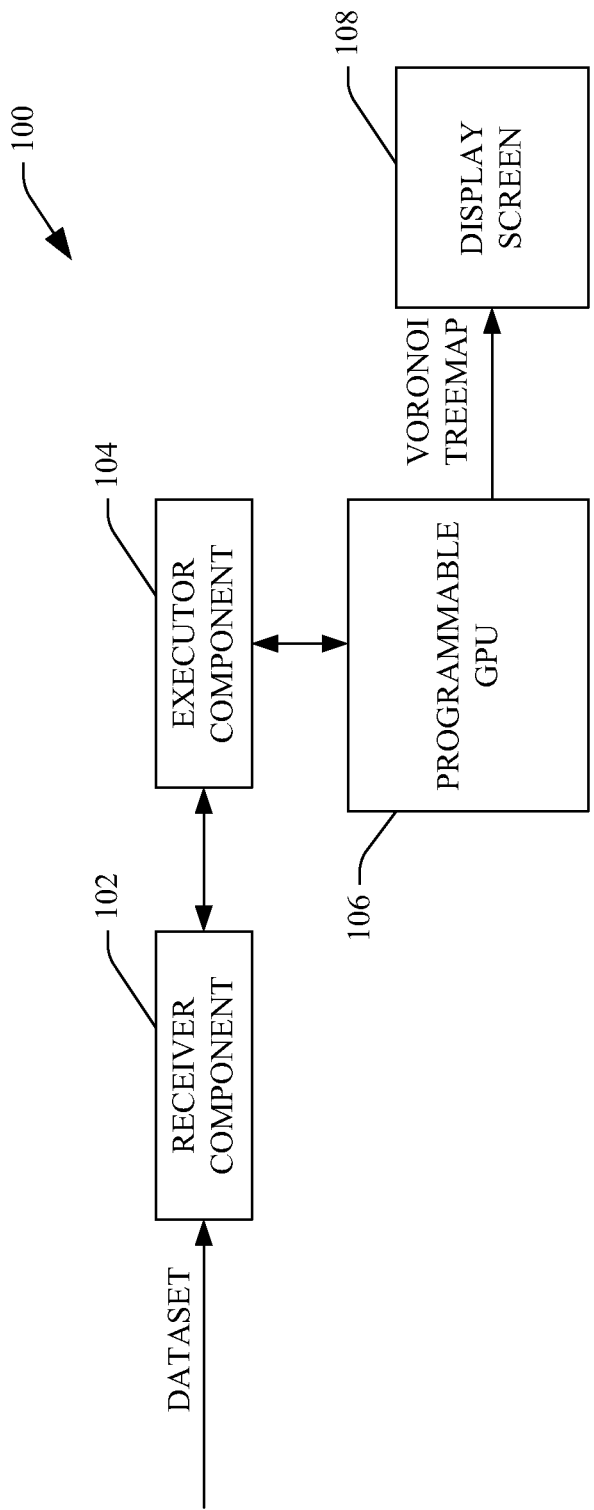
FIG. 1 is a functional block diagram of an example system that facilitates generating a Voronoi treemap through utilization of a programmable graphical processing unit.

Various technologies pertaining to generating Voronoi treemaps through utilization of programmable graphical processing units will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates generating a Voronoi treemap is illustrated. Pursuant to an example, the system 100 may be included in a computing device, such as a personal computer, laptop computer, gaming console, portable computing device, etc. The system 100 includes a receiver component 102 that receives a dataset, wherein the dataset is a tree-structured (hierarchical) data set. For example, the dataset may include data that represents an organizational hierarchy, a number of individuals playing certain video games at certain instances in time, a number of individuals visiting certain websites at different instances in time, etc.

The system 100 can additionally include an executor component 104 that is in communication with the receiver component 102. A programmable graphical processing unit 106 can act in accordance with instructions from the executor component 104. For example, the executor component 104 can cause the programmable graphical processing unit 106 to generate a Voronoi treemap based at least in part upon the tree-structured dataset received by the receiver component 102. As will be shown and described in greater detail below, the Voronoi treemap comprises a bounding area and a plurality of subareas within the bounding area, wherein the bounding area and subareas are representative of dimensions and hierarchical relationships of the tree-structured data. Voronoi treemaps will be described in greater detail below.

A display screen 108 can be in communication with the programmable graphical processing unit 106. The display screen 108 can be configured to display the Voronoi treemap that is generated by the programmable graphical processing unit 106 (e.g., the programmable graphical processing unit 106 can cause the display screen 108 to display the Voronoi treemap). For example, the display screen 108 can be a portion of or a peripheral of a computing device. Thus, the display screen 108 may be a portion of a personal computer, a laptop computer, a portable computing device such as a portable telephone, a multimedia player, a personal digital assistant. In another example, the display screen 108 may be a portion of a television, may be a screen that receives images output from a projector, etc.

Voronoi treemaps will now be described in greater detail. Voronoi treemaps are treemaps utilized to visualize relatively large amounts of tree-structured data. When generating the Voronoi treemap, the executor component 104 and the programmable graphical processing unit 106 can act in accordance with the following constraints and optimization criterion: 1) the executor component 104 can cause the programmable graphical processing unit 106 to divide a bounding area into subareas that fully utilize the overall areas in the bounding area, thereby avoiding holes and overlappings; 2) the executor component 104 can cause the programmable graphical processing unit 106 to generate subareas that have an overall aspect ratio between width and height to converge to a desired number (e.g., one); 3) the executor component 104 can cause the programmable graphical processing unit 106 to avoid grouping siblings in the tree-structured data, thereby causing identification of hierarchical structures to be non-ambiguous; and 4) the executor component 104 can cause the programmable graphical processing unit 106 to generate subareas that are non-regular in shape (e.g., non-rectangular), such that edges between subareas do not appear to run into one another.

To satisfy the first constraint, the executor component 104 can cause the programmable graphical processing unit 106 to use polygons to divide an area into subareas, wherein a polygon is a closed plane figure with n sides. Additionally, polygons can be subdivided into smaller polygons, and can have arbitrary shapes (polygons with many sides can approximate curves).

The executor component 104 can cause the programmable graphical processing unit 106 to take an iterative approach in connection with generating the Voronoi treemap, and the programmable graphical processing unit 106 can undertake some parallel computing processes to effectively reduce computational complexity corresponding to generating the Voronoi treemap. For example, first the programmable graphical processing unit 106 can create a polygonal subdivision of a bounding area according to a top hierarchy level in the tree-structured data. The output is, accordingly, a plurality of polygons with a desired aspect ratio between width and height that represent branches of the top hierarchy level in the tree-structured data received by the receiver component 102. The procedure is then performed recursively for top-level branches in the respective polygons. The programmable graphical processing unit 106 can use Voronoi diagrams in connection with generating polygonal subdivisions. Voronoi diagrams are described in detail below. In particular, the programmable graphical processing unit 106 can generate a hierarchy of weighted centroidal Voronoi diagrams in connection with generating the Voronoi treemap.

Voronoi diagrams refer to partitioning of an m-dimensional space without producing holes or overlappings. Explanations of Voronoi diagrams are restricted to relevant aspects regarding their application for treemap layouts. For instance, planar Voronoi diagrams in the two-dimensional Euclidian space are described.

For example, $P:=\{p_1, \ldots, p_n\}$ can be a set of n distinct points in a compact domain $\mathbb{R}^2$ with coordinates $(x_1, y_1), \ldots (x_n, y_n)$. Such points can be referred to as generators or sites. The subdivision of $\mathbb{R}^2$ into n Voronoi regions $V(p_i)$, with a property that a point $q(x, y)$ lies in the region $V(p_i)$ if and only if $\text{distance}(p_j, q)$ for each $p_i, p_j \in P$ with $i \neq j$, can be defined as a Voronoi diagram $V(P):=\{V(p_1), \ldots, V(p_n)\}$. The denotation $\text{distance}(p_j, q)$ can represent a specified distance function between the generator $p_i$ and the point q. In general, a Voronoi diagram can be defined in an unbounded space. Having a bounded space S, the set $V_{\cap S}(P):=\{V(p_1) \cap S, \ldots, V(p_n) \cap S\}$ can be referred to as a bounded Voronoi diagram of P by S. An ordinary Voronoi diagram $V_\epsilon(P)$ can refer to a Voronoi diagram using a Euclidian metric, defined by the following as a distance function for subareas (regions) in the diagram:

$$\text{distance}_\epsilon(p_i, q) := \|p_i - q\| = \sqrt{(x_i - x)^2 + (y_i - y)^2}.$$

The bisector of two regions $V_\epsilon(p_i)$ and $V_\epsilon(p_j)$ of an ordinary Voronoi diagram is the perpendicular bisector of the generators $p_i$ and $p_j$.

As noted above, the executor component 104 and the programmable graphical processing unit 106 can act in conjunction to generate weighted Voronoi diagrams. For instance, in the basic Voronoi diagram V(P) it is assumed that each generator has a substantially similar weight. As an extension, a set of parameters W may be given, and to each generator $p_i \in P$ a parameter $w_i \in W$ can be assigned. By using weighted generators, it is possible to define weighted distance functions, generating weighted Voronoi diagrams V(P, W).

In an example, an additively weighted Voronoi diagram (AW Voronoi diagram) $V_{aw}(P, W)$ can use the following distance function between a generator $p_i \in P$ with an assigned weight $w_i \in W$ and a point q:

$$\text{distance}_{aw}(p_i, w_i, q) := \|p_i - q\| - w_i.$$

The bisector of two regions $V_{aw}(p_i, w_i)$ and $V_{aw}(p_j, w_j)$ of an AW Voronoi diagram forms a hyperbolic curve with foci $p_i$ and $p_j$.

The distance function for the additively weighted power Voronoi diagrams (PW Voronoi diagrams) $V_{pw}(P, W)$ may be as follows:

$$\text{distance}_{aw}(p_i, w_i, q) := \|p_i - q\|^2 - w_i.$$

The above distance function can yield a bisector of two regions $V_{pw}(p_i, w_i)$ and $V_{pw}(p_j, w_j)$ that is a straight line. The bisector corresponds to the perpendicular bisector of $p_i$ and $p_j$ moved away from their midpoint depending on their weights $w_i$ and $w_j$.

Both the AW and the PW Voronoi diagram may be illustrated as Voronoi diagrams that are using circles as generators. Thus, the weight $w_i$ in the AW distance function can represent directly the radius of the circle, whereas in the PW distance function $w_i$ can represent the square of the radius. As noted above, the circles should not overlap. Additionally, the abstraction of circles with negative radii can be made to achieve a complete spectrum of possible Voronoi diagrams for the AW and PW distance function.

Additionally or alternatively, the executor component 104 can act in conjunction with the programmable graphical processing unit 106 to generate centroidal Voronoi diagrams (and include such diagrams in a Voronoi treemap). The center of mass, or centroid, $c_i$ of a Voronoi region $V(p_i)$ within the Euclidian space can be calculated by $c_i = \int v_{(p_i)} x dx$. A centroidal Voronoi diagram (CVD) refers to a Voronoi diagram with a property that each generator $p_i$ is itself the center of mass $c_i$ of the corresponding Voronoi region/subarea $V(p_i)$. There may exist many different CVDs for a given number of generators.

The mathematical relevance of the CVD can be founded by its relationship to the following energy function:

$$\mathcal{K}(P, V(P)) = \sum_i \int_{V_{(p_i)}} \|x - p_i\|^2 \, dx.$$

A condition for $\mathcal{K}(P, V(P))$ to be minimized can be that $V(P)$ is a CVD. In an example, approximations of CVDs can be determined that are located in local minima of $\mathcal{K}(P, V(P))$.

Details pertaining to the programmable graphical processing unit 106 generating a Voronoi treemap will now be provided. As indicated above, generating a Voronoi treemap is an iterative process that comprises multiple iterations. For instance, the programmable graphical processing unit 106 can utilize at least two iterations to generate the Voronoi treemap (e.g., a prior iteration and a subsequent iteration), wherein the second (subsequent) iteration dependent upon a result of the first (prior) iteration. Causing iterations to depend from one another can significantly reduce computational time used to generate the Voronoi treemap. An iteration can involve selecting starting locations for a plurality of subareas in a constrained visual space, and thereafter iteratively computing Voronoi subareas and adjusting weights and centers of Voronoi subareas until the subareas converge to a constrained aspect ratio (e.g., 1:1 width to height aspect ratio) in the constrained visual space.

The executor component 104 can determine the grid resolution and/or the sampling resolution to be used in connection with generating the Voronoi treemap based upon a maximum allowed error between a size of a weighted Voronoi subarea and a desired weight of its corresponding branch in the tree-structured data. For a maximum allowed error $\epsilon_{max}$, a render target grid resolution (M×M) can be chosen by the executor component 104 such that the size of each pixel to be displayed on the display screen 108 is $$\delta_{pix} = \frac{1}{M^2} \leq \frac{1}{2\epsilon_{max}}.$$

The weight term in an additive-weighted distance function is unbounded and can, in some instances, be negative. This can cause the distance function to be outside [0,1] range even when the domain is bounded by $$\left[0, \frac{\sqrt{2}}{2}\right]^2,$$

which can cause errors during computations undertaken by the programmable graphical processing unit 106. To address this issue, an affine transform on the distance function can be undertaken. For example, $w_{min}$ and $w_{max}$ can be minimum and maximum weights among all sites, and $D_{max}$ can be maximum Euclidean distance among all pairs of sites ($D_{max} \leq 1$ from the domain definition). Then, for a pixel q and site $p_i$, the following can be ascertained:

$$d_{aw}(q, p_i) = \|q - p_i\| - w_i.$$

Affine transforms on the distance function and weight can be defined as follows:

$$d'_{aw}(q, p_i) = \frac{\|q - p_i\|}{D_{max} + w_{max} - w_{min}} - w'_i$$

$$w'_i = \frac{w_{max} - w_i}{D_{max} + w_{max} - w_{min}}$$

Thus, the programmable graphical processing unit can be caused to determine position of at least one centroid of a subarea in the Voronoi treemap with respect to a pixel on the display screen of the computing device.

It can be shown that $0 \leq w_i' \leq 1$ and $0 \leq d_{aw}'(q, p_i) \leq 1$. In addition, the affine transform is semantically equivalent to translating the distance cones along a Z axis. Therefore, the distance cones can be projected to an XY plane, and the discrete Voronoi treemap does not change, even though the relative weight ratios are not preserved (e.g., $w_i'/w_j' \neq w_i/w_j$).

Since the range of distance $d_{aw}'$ is [0,1], the weighted Voronoi treemap can be computed using a depth buffer on the programmable graphical processing unit 106. Furthermore, since the weight $w_i'$ is also in unit range, such weight can be passed to a pixel shader (not shown) using a color channel corresponding to the programmable graphical processing unit 106. $D_{max} + w_{max} - w_{min}$ is a constant for all sites, and can be passed as a uniform shader parameter. For $\|q - p_i\|$, $(q - p_i)$ can be computed, for instance, using texture coordinate linear interpolation hardware on the programmable graphical processing unit 106 and the pixel shader can be used to compute a norm and affine transform of the distance function.

As indicated above, the executor component 104 can cause the programmable graphical processing unit 106 to generate a CVD in connection with outputting the Voronoi treemap. In operation, the programmable graphical processing unit 106 can compute a weighted CVD for each intermediate area or subarea in the tree-structured data within a connected sub-domain. This sub-domain refers to the weighted Voronoi region of the subarea in the weighted CVD of its parent area (for the root area the sub-domain is the starting domain). Pursuant to an example, weighted CVD computation by the programmable graphical processing unit 106 can be restricted to the sub-domain using the stencil buffer. Before the first iteration of CVD computation, the programmable graphical processing unit 106 can clear the stencil buffer and copy a binary image of resolution M×M defining the sub-domain into the stencil buffer. Stencil writes can be disabled, and stencil test can be enabled to pass the pixel shader if the value in the stencil buffer is 1.

The approach described above has a computation complexity of $O(N M^2)$ for each iteration, and the computation complexity for l iterations is $O(lN M^2)$. To reduce computation complexity, coherence in the weighted Voronoi diagram can be exploited across two iterations to compute conservative distance bounds and reduce the computation complexity for one iteration to $O(cM^2)$, where $1 \le c \ll N$ (e.g., one iteration can depend from another iteration)

For example, $N_i^l$ can denote the set of Voronoi neighbors for site $p_i$ at iteration l. It has been observed that the neighbor set of a weighted Voronoi diagram does not change significantly across two iterations, e.g. $N_i^{l+1} \ne N_i^l$. $D_i^l$ can denote the maximum radius of the Voronoi region of site $p_i$ at iteration l. Clearly, $D_i^l$ is the distance of a point q on the boundary of the Voronoi region of site $p_i$, e.g., $D_i^l = d_{aw}^l(q, p_i) = d_{aw}^l(q, p_j)$, where $p_j \in N_i^l$. Since the Voronoi boundary is composed of hyperbolic segments, the point q is a vertex in the Voronoi diagram of site $p_i$, e.g., q is equidistant to $p_i$, $p_j$ and $p_k$, where $p_j$, $p_k \in N_i^l$ and $p_j$ and $p_k$ are Voronoi neighbors. Additionally, it can be shown that $D_i^{l+1} \le \max(d_{aw}^{l+1}(q, p_i))$, where q is the set of vertices equidistant to $p_i$, $p_j$ and $p_k$, where $p_j$, $p_k \in N_i^l$ and $p_j$ and $p_k$ are Voronoi neighbors in iteration l.

Given the above, the executor component 104 can cause the programmable graphical processing unit 106 to compute the radius $D_i^{l+1}$ of a Voronoi region of site $p_i$ at iteration l+1 is as follows: the programmable graphical processing unit 106 can compute the weighted Voronoi diagram for iteration l, using the upper bound $D_i^l$ for each site $p_i$. Thereafter, for each site $p_i$, the programmable graphical processing unit 106 can compute the neighbor set $N_i^l$. The programmable graphical processing unit 106 can then update positions and weights for all sites, and can update the upper bound $D_i^{l+1}$ for each site $p_i$ through utilization of $D_i^{l+1} \le \max(d_{aw}^{l+1}(q, p_i))$.

For the initial iteration, $D_i^1$ can be set as a bounding area of the sub-domain. Updating the upper bounds has computational complexity $O(N)$. Using the upper bounds the cost of computing the weighted Voronoi diagram on the programmable graphical processing unit 106 is reduced to $O(cM^2)$, where c=N for the 1$^{st}$ iteration. It can be ascertained, however, that c→1 as number of iterations increases, making the amortized cost of l iterations $O(lM^2)$.

Figure 2:
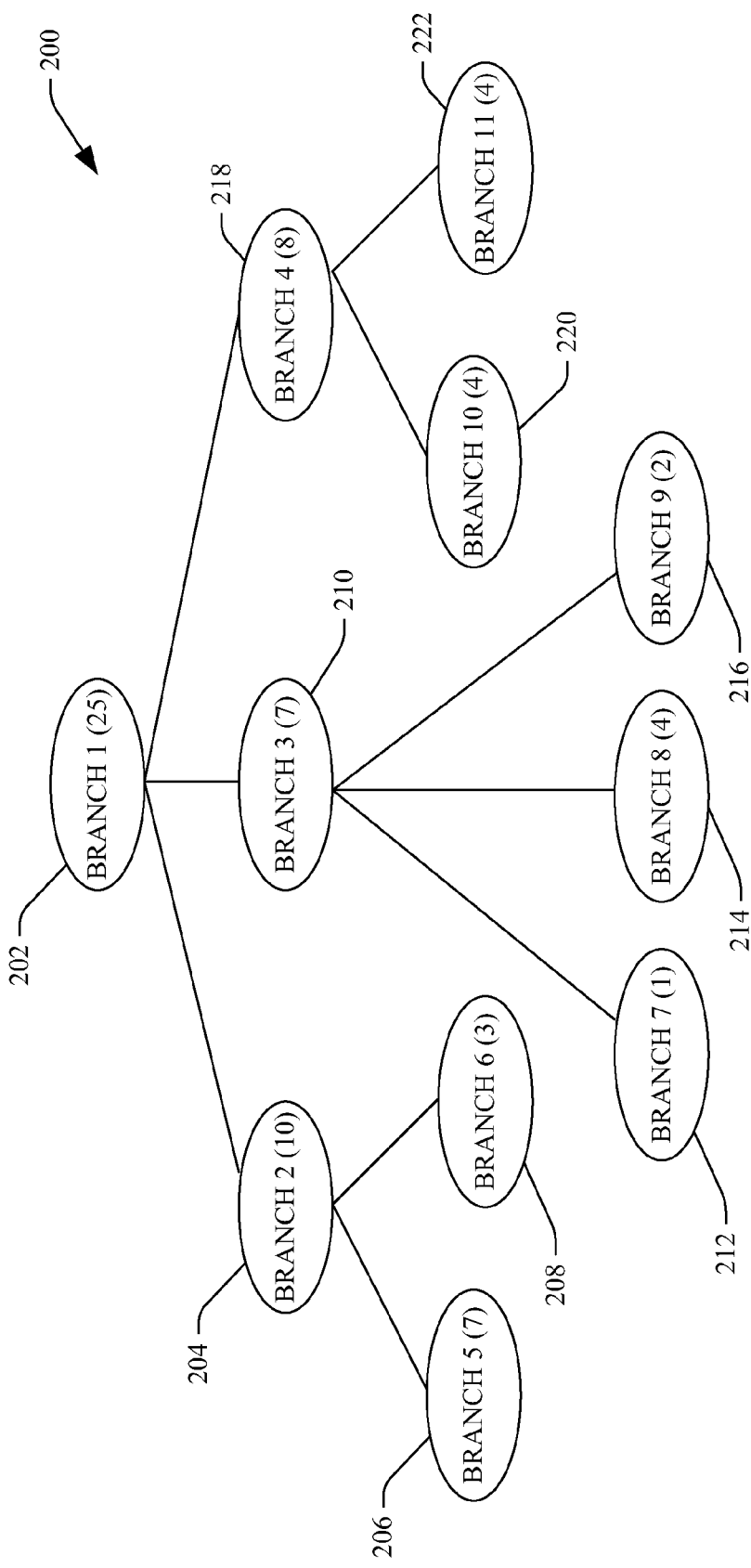
FIG. 2 is an example depiction of a tree-structured data set.

Referring now to FIG. 2, an example tree-structured dataset 200 is illustrated, wherein a weighted Voronoi treemap can be generated based at least in part upon the dataset 200. The dataset 200 comprises a plurality of branches 202-222, wherein each of the branches has a value (weight) corresponding thereto. For example, the dataset 200 may represent an organizational hierarchy that comprises twenty five individuals. The root branch 202 thus has a weight of twenty five. A first sub-organization represented by the branch 204 has ten individuals therein (and thus has a weight of ten assigned thereto). The first sub-organization includes two sub-organizations represented by the branches 206 and 208 which have seven and three individuals therein, respectively. For sake of brevity, remaining branches of the structured dataset 200 will not be described. One can ascertain, however, that such structured dataset 200 may be visualized through utilization of a Voronoi treemap.

Figure 3:
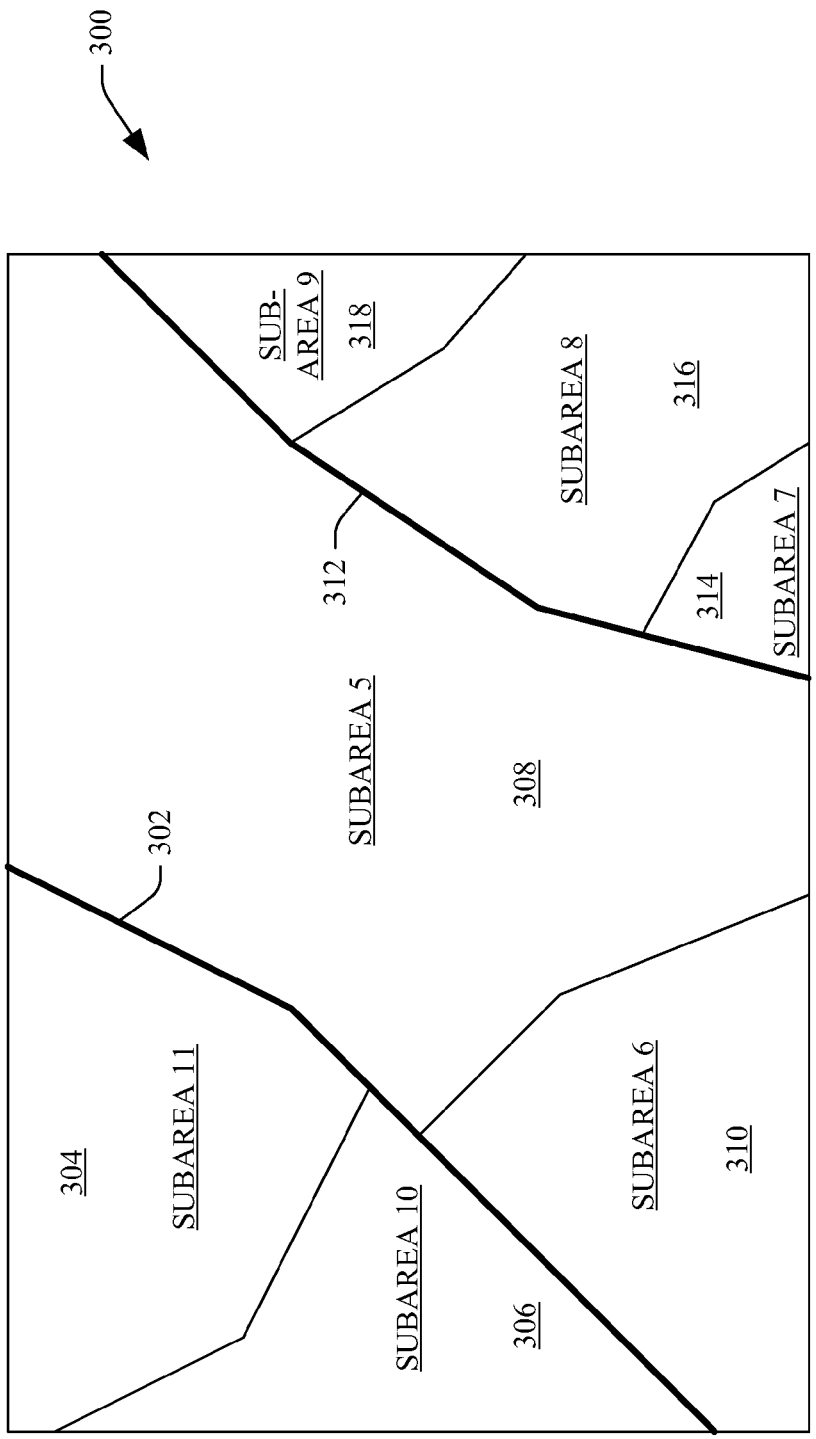
FIG. 3 is an example depiction of a Voronoi treemap that is based at least in part upon the tree-structured data set.

Turning now to FIG. 3, an example Voronoi treemap 300 that can be generated by the executor component 104 (FIG. 1) in conjunction with the programmable graphical processing unit 106 is illustrated, wherein the Voronoi treemap 300 is based upon the dataset 200 of FIG. 2. As can be discerned, the Voronoi treemap 300 comprises multiple subareas that represent branches of the tree-structured dataset 200 and weights corresponding thereto. Moreover, the subareas can converge to an approximate 1:1 width to height ratio. Still further, subareas can be assigned graphical indicia to indicate which subareas are related to one another. For instance, a darkened line 302 can indicate that subareas 304 and 306 are logically related and separate from subareas 308 and 310. Furthermore, a darkened line 312 can indicate that subareas 314, 316, and 318 are related and separate from the subareas 308 and 310 (and subareas 304 and 306).

In another example, subareas can be assigned certain colors to indicate which subareas represent branches of certain parent nodes in the tree-structured dataset 200. For instance, the subareas 304 and 306 can be assigned a first color (or different shades of the first color), subareas 308 and 310 can be assigned a second color (or different shades of the second color), and subareas 314, 316, and 318 can be assigned a third color (or different shades of the third color).

Figure 4:
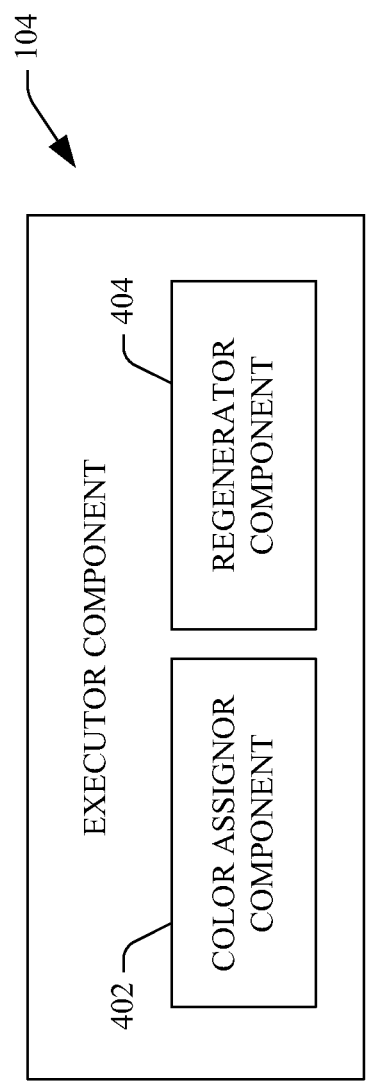
FIG. 4 illustrates an example component used in connection with generating a Voronoi treemap.

Turning now to FIG. 4, an example depiction of the executor component 104 is illustrated. The executor component 104 may comprise a color assignor component 402 that can cause the programmable graphical processing unit 106 (FIG. 1) to assign colors to different nodes in the Voronoi treemap to cause subareas to be visually distinct from one another. For example, the color assignor component 402 can cause the programmable graphical processing unit 106 to assign different colors to different top-level branches in a tree-structured dataset. Furthermore, the color assignor component 402 can cause the programmable graphical processing unit 106 to assign different shades of a color to Voronoi subareas in the Voronoi treemap that correspond to branches in the tree-structured dataset that have a common parent branch. Thus, an individual can ascertain which branches are related to one another in the tree-structured dataset.

The executor component 104 may additionally include a regenerator component 404 that can cause the programmable graphical processing unit 106 (FIG. 1) to dynamically update the Voronoi treemap upon receipt of additional data in the tree-structured dataset and/or upon altered viewspace corresponding to the Voronoi treemap being altered (e.g., a pan, a zoom, . . . ). Specifically, when updating a Voronoi treemap based upon a change in underlying data or alteration in viewspace corresponding to the Voronoi treemap, the following can occur: weights of branches in the tree-structured dataset can change, some subareas can be removed from the diagram, or some subareas can be added to the diagram. The addition or removal of a branch can be modeled by way of changing a weight of a branch to or from zero. In general, the executor component 104 can cause the programmable graphical processing unit 106 to dynamically update the Voronoi treemap based at least in part upon the receipt of the additional data or a command from a user to alter a viewspace pertaining to the Voronoi treemap.

With more specificity, the regenerator component 404 can dynamically update a Voronoi treemap based at least in part upon locations of existing subareas. For example, given that a parent subarea has been resized and moved, child subareas can be seeded based upon their position in a local coordinate system. If the original (x,y) coordinates in a global space are utilized, the children would be incorrectly located. Thus, child subareas can be seeded by the regenerator component 404 based at least in part upon relative location with respect to a new location of a parent subarea. The newly-weighted parent, however, may have changed proportions (the parent may be long and skinny or rotated), and thus use of an affine transform may be inappropriate. Thus, for example, relative position of the child subareas with respect to the centroid can be computed in polar coordinates (thereby determining a distance and angle of the child subareas from the centroid of the parent). Seeds for the child subareas may then be placed at same relative positions to the centroid.

In another example, the regenerator component 404 can define a local coordinate system prior to the programmable graphical processing unit 106 dynamically updating the Voronoi treemap, wherein the local coordinate system is generated for one or more Voronoi subareas that may be subject to alteration. Thereafter, a location of a centroid of the subarea can be ascertained in the local coordinate system (prior to the programmable graphical processing unit dynamically updating the Voronoi treemap). The local coordinate system and the centroid can be retained in memory that is accessible by the programmable graphical processing unit 106. The programmable graphical processing unit 106 may thereafter dynamically update the Voronoi treemap based at least in part upon the local coordinate system and the determined centroid. For instance, the local coordinate system can be shrunk in the Voronoi treemap, and the centroid can be positioned appropriately in the shrunken coordinate system. The regenerator component 404 can then cause a morph to be undertaken in the shrunken local coordinate system (frame), and can execute an optimization algorithm to preserve relative position of subareas that correspond to the local coordinate system. An example is provided below for sake of explanation.

Figures 5, 6:
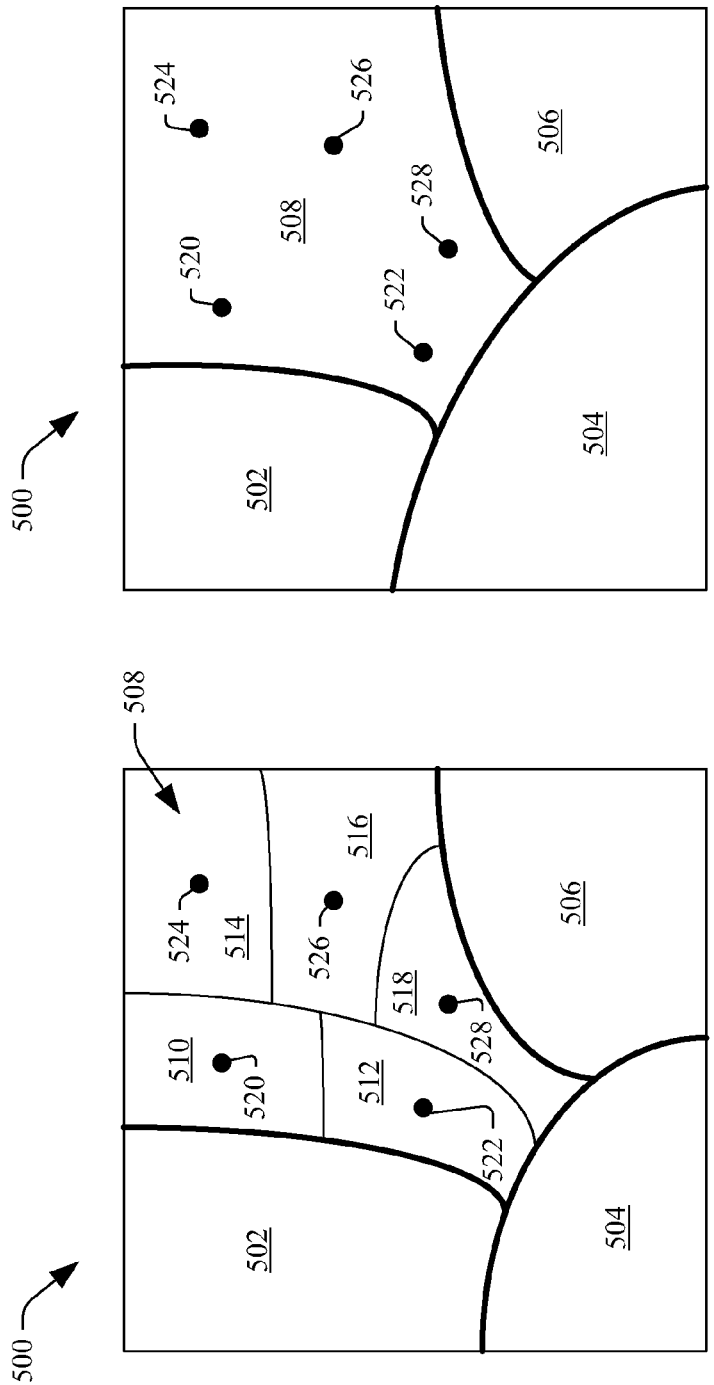
FIG. 5 illustrates an example Voronoi treemap.
FIG. 6 illustrates portions of the example Voronoi treemap changing shape.

Turning now to FIG. 5, an example Voronoi treemap 500 is illustrated. The Voronoi treemap 500 comprises four Voronoi subareas: a first subarea 502, a second subarea 504, a third subarea 506, and a fourth subarea 508 that correspond to four top-level branches in a hierarchy of a tree-structured dataset. The fourth subarea 508 has five subareas 510-518 included therein. Each of the five subareas 510-518 has a centroid 520-528, respectively. Pursuant to an example, data may alter in the underlying tree-structured dataset, such that a dimension corresponding to the data underlying the Voronoi subarea 504 alters. For instance, an alteration to the underlying data may desirably cause the Voronoi subarea 504 to grow (and thus cause other subareas to shrink).

With reference now to FIG. 6, the example Voronoi treemap 500 is depicted, wherein the size of the first subarea 502 has altered due to change in underlying data. Additionally, size of the second, third, and fourth subareas 504-508 alters due to the alteration in size of the first subarea 502. The centroids 520-528 of the five subareas 510-518 (FIG. 5) are also depicted. If such centroids 520-528 are used as a basis to regenerate the five subareas 510-518, such subareas 510-518 would be distorted.

Figures 7, 8:
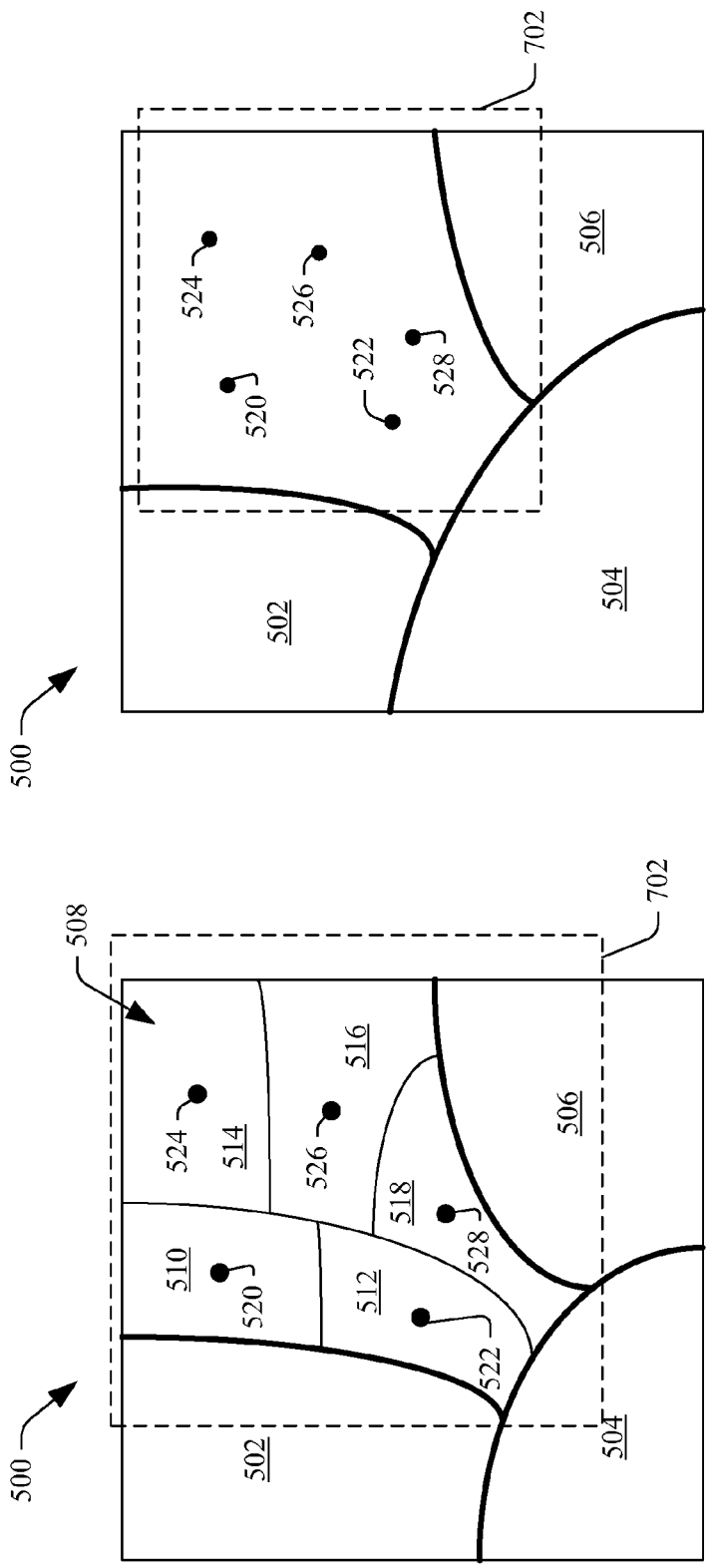
FIG. 7 illustrates generation of a local coordinate system with respect to a Voronoi treemap.
FIG. 8 illustrates utilization of the local coordinate system to place child subareas in a Voronoi treemap.

Now referring to FIG. 7, the example Voronoi treemap 500 is depicted prior to the Voronoi treemap 500 being regenerated. A local coordinate system 702 can be defined with respect to the fourth Voronoi subarea 508. Furthermore, locations of the centroids 520-528 can be determined in the local coordinate system 702 and retained.

With reference to FIG. 8, the example Voronoi treemap 500 is again depicted. In FIG. 8, the local coordinate system 702 has been shrunken to correspond with the size of the fourth Voronoi subarea 508. Of course, if the fourth Voronoi subarea 508 had enlarged, the coordinate system 702 would also be enlarged. The locations of the centroids 520-528 can be retained in the local coordinate system 702, such that their relative position to one another is unchanged. The position of the centroids 520-528 in the fourth Voronoi subarea 508 may then be utilized as initial positions in connection with determining location/size of corresponding Voronoi subareas 510-518. For example, a morph can be undertaken in the local coordinate system 702, and an optimization algorithm can be executed to properly position the Voronoi subareas 510-518. Additionally or alternatively, position of the centroids 520-528 relative to the centroid of the subarea 508 can be determined in polar coordinates, and such polar coordinates can be used to seed the subareas 510-518.

Figure 9:
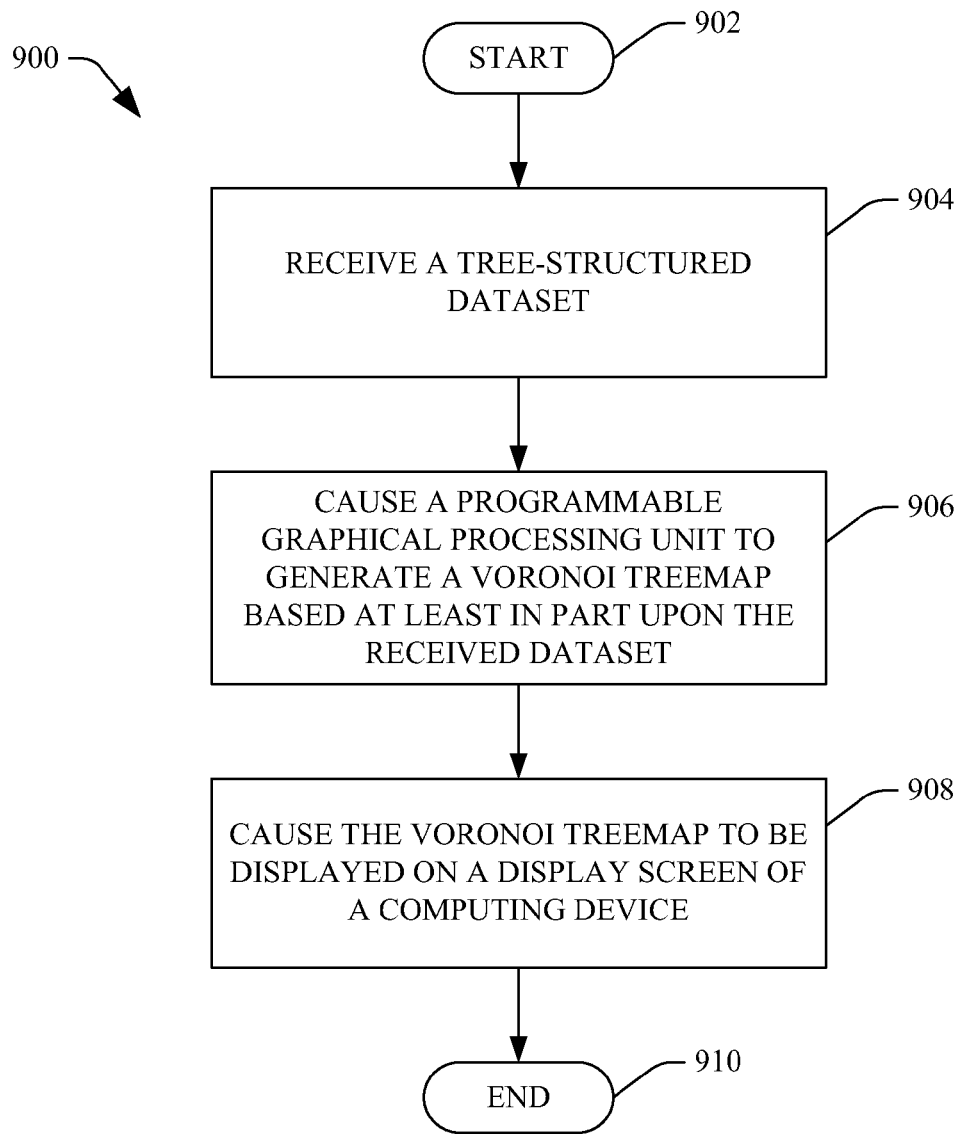
FIG. 9 is a flow diagram that illustrates an example methodology for generating a Voronoi treemap through utilization of a programmable graphical processing unit.
Figure 10:
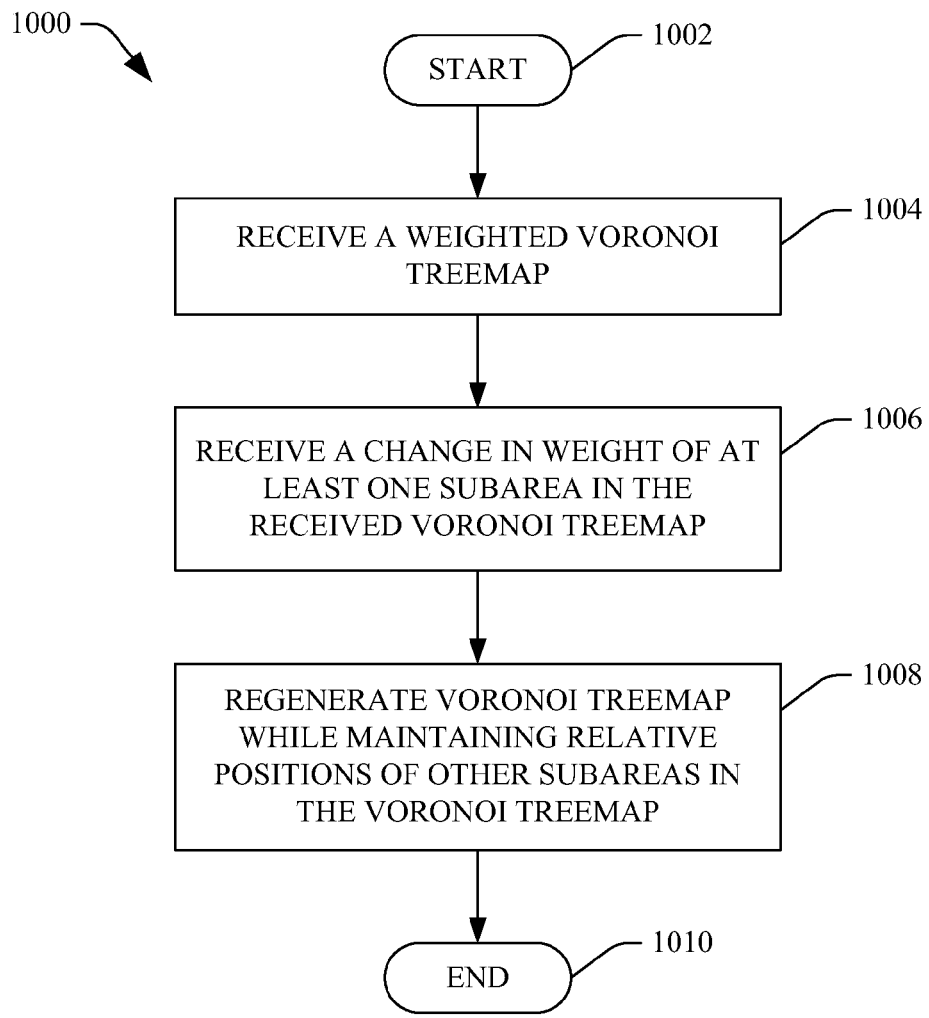
FIG. 10 is a flow diagram that illustrates an example methodology for regenerating a Voronoi treemap while maintaining relative position of child subareas in the Voronoi treemap.

With reference now to FIGS. 9-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 9, a methodology 900 that facilitates causing a Voronoi treemap to be displayed on a computing device is illustrated. The methodology 900 begins at 902, and at 904 a dataset is received, wherein the dataset is a tree-structured dataset that comprises a plurality of hierarchically related branches.

At 906, a programmable graphical processing unit is caused to generate a Voronoi treemap based at least in part upon the received tree-structured dataset. For instance, parallel processing capabilities of the programmable graphical processing unit can be leveraged when generating the Voronoi treemap. Additionally, the programmable graphical processing unit can determine locations of Voronoi subareas to pixel-precision (e.g., which pixels are edges of Voronoi subareas), rather than to arbitrary positions that are later mapped to a general processing unit. In another example, the programmable graphical processing unit can be caused to generate at least one weighted centroidal Voronoi diagram (e.g., a hierarchy of weighted centroidal Voronoi diagrams). The programmable graphical processing unit may then generate the Voronoi treemap based at least in part upon the at least one weighted centroidal Voronoi diagram.

At 908, the Voronoi treemap can be caused to be displayed on a display screen of a computing device, wherein the computing device may be any suitable computing device. The methodology 900 completes at 910.

With reference now to FIG. 10, an example methodology 1000 that facilitates regenerating a Voronoi treemap is illustrated. The methodology 1000 starts at 1002, and at 1004 a weighted, centroidal Voronoi treemap is received.

At 1006, a change in weight corresponding to at least one subarea in the Voronoi treemap is received. For example, a dimension corresponding to at least one branch in a tree-structured dataset can be altered.

At 1008, the Voronoi treemap is regenerated while maintaining relative positions of child subareas in the at least one subarea. As described above, this can be accomplished through utilization of a local coordinate system that corresponds to the at least one subarea or through computation of polar coordinates of centroids of child subareas with respect to a centroid of a parent subarea. The methodology 1000 completes at 1010.

Figure 11:
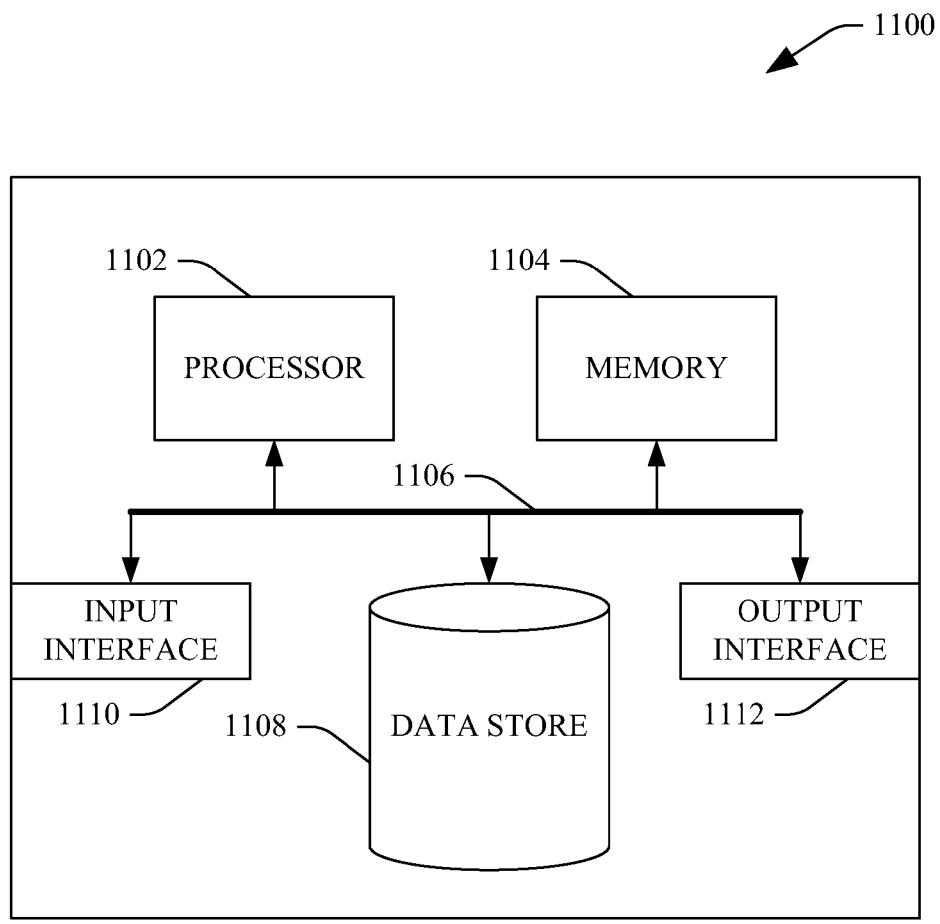
FIG. 11 is an example computing system.

Now referring to FIG. 11, a high-level illustration of an example computing device 1100 that can be used in accordance with the systems and methodologies disclosed herein is illustrated. For instance, the computing device 1100 may be used in a system that supports generating a Voronoi treemap and causing the Voronoi treemap to be displayed on a display screen of a computing device. In another example, at least a portion of the computing device 1100 may be used in a system that supports regenerating a Voronoi treemap when a change in dimension of data in an underlying tree-structured dataset is received. The computing device 1100 includes at least one processor 1102 that executes instructions that are stored in a memory 1104. For example, the processor 1102 may be a programmable graphical processing unit. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a local coordinate system, a tree-structured dataset, centroidal data.

The computing device 1100 additionally includes a data store 1108 that is accessible by the processor 1102 by way of the system bus 1106. The data store 1108 may include executable instructions, a local coordinate system, centroidal information, etc. The computing device 1100 also includes an input interface 1110 that allows external devices to communicate with the computing device 1100. For instance, the input interface 1110 may be used to receive instructions from an external computer device, from an individual, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising acts that are executed by a programmable processing unit, the acts comprising:
   receiving a tree-structured dataset, wherein the tree-structured dataset comprises a plurality of hierarchically related branches;
   generating a Voronoi treemap based at least in part upon the tree-structured dataset, wherein the Voronoi treemap comprises a plurality of subareas that are representative of branches and hierarchical relationships between branches;
   displaying the Voronoi treemap on a display screen of a computing device;
   subsequent to the displaying of the Voronoi treemap on the display screen of the computing device, receiving at least one of:
      an indication that a view space in which the Voronoi treemap is displayed is desirably altered; or
      changes in data in the tree-structured dataset; and
   dynamically updating the Voronoi treemap displayed on the display screen of the computing device based at least in part upon the at least one of the indication or the changes in the data in the tree-structured data set.

2. The method of claim 1, wherein generating the Voronoi treemap comprises determining position of at least one centroid of a subarea in the Voronoi treemap with respect to a pixel on the display screen of the computing device.

3. The method of claim 1, the acts further comprising:
   displaying a first subarea in the Voronoi treemap in a first color on the display screen of the computing device; and
   displaying a second subarea in the Voronoi treemap in a second color on the display screen of the computing device.

4. The method of claim 3, wherein the first subarea in the Voronoi treemap comprises a plurality of child subareas, and wherein the child subareas are assigned various shades of the first color.

5. The method of claim 1, the acts further comprising:
   generating at least one weighted centroidal Voronoi diagram, wherein the programmable processing unit generates the Voronoi treemap based at least in part upon the at least one weighted centroidal Voronoi diagram.

6. The method of claim 5, wherein generating the at least one weighted centroidal Voronoi diagram is an iterative process that comprises at least two iterations, wherein a subsequent iteration is dependent upon a prior iteration.

7. The method of claim 1, the acts further comprising:
   generating a local coordinate system for at least one subarea in the Voronoi treemap prior to the programmable processing unit dynamically updating the Voronoi treemap;
   determining a location of a centroid of the at least one subarea in the local coordinate system prior to the programmable processing unit regenerating the Voronoi treemap; and
   dynamically updating the Voronoi treemap based at least in part upon the determined location of the centroid of the at least one subarea.

8. The method of claim 7, the acts further comprising:
   modifying size of the at least one subarea, wherein the at least one subarea comprises a plurality of child subareas;
   modifying size of the local coordinate system as a function of modifying size of the at least one subarea;
   positioning the plurality of child subareas in relation to the at least one subarea based at least in part the location of the centroid in the local coordinate system; and
   dynamically updating the Voronoi treemap based at least in part upon relative positions of the child subareas with respect to the centroid of the subarea in the local coordinate system.

9. The method of claim 7, the acts further comprising maintaining a relative position of the plurality of child subareas with respect to one another in the at least one subarea.

10. The method of claim 1 configured for execution in a gaming console.

11. The method of claim 1, wherein generating the Voronoi treemap based at least in part upon the tree-structured dataset comprises selecting a render target grid resolution for display of the Voronoi treemap such that a size of each pixel computed by the graphical processing unit is below a defined threshold.

12. The method of claim 1, wherein the programmable processing unit is a graphical processing unit, and wherein the plurality of subareas of the Voronoi treemap is computed in parallel.

13. A system comprising:
a programmable processing unit; and
a memory that comprises a plurality of components that are executed by the programmable processing unit, the plurality of components comprising:
  a receiver component that receives a tree-structured dataset that includes multiple branches that are hierarchically related to one another;
  an executor component that causes the programmable processing unit to generate a Voronoi treemap based at least in part upon the tree-structured dataset, wherein the Voronoi treemap comprises a plurality of subareas that correspond to the multiple branches, and wherein the Voronoi treemap represents hierarchical relationships between the multiple branches; and
  a regenerator component that causes the programmable processing unit to dynamically update the Voronoi treemap responsive to receiving at least one of:
    an indication that at least a portion of the Voronoi treemap is desirably viewed in an altered view space; or
    an alteration in data in the tree-structured dataset, wherein the alteration in data causes a desired size of at least one subarea in the Voronoi treemap to alter.

14. The system of claim 13, wherein a gaming console comprises the receiver component and the executor component.

15. The system of claim 13, wherein the programmable processing unit generates a weighted centroidal Voronoi diagram based at least in part upon at least one branch in the tree-structured dataset, wherein the programmable graphical processing unit generates the Voronoi treemap based at least in part upon the weighted centroidal Voronoi diagram.

16. The system of claim 13, wherein the programmable processing unit is configured to cause the Voronoi treemap to be displayed on a display screen of a computing device.

17. The system of claim 13, wherein the plurality of components further comprises a color assignor component that assigns different colors to different subareas to cause subareas in the Voronoi treemap to be visually distinctive from one another.

18. The system of claim 13, wherein the programmable processing unit is a graphical processing unit, and wherein the plurality of subareas of the Voronoi treemap is computed in parallel.

19. A programmable processing unit in a computing device configured to perform acts, comprising:
receiving a tree-structured dataset, wherein the tree-structured dataset comprises multiple branches that are in a hierarchical relationship with one another;
generating a weighted, centroidal Voronoi treemap that comprises a plurality of subareas that are representative of the multiple branches of the tree-structured dataset, wherein size of a subarea in the Voronoi treemap is indicative of a dimension of data represented by a branch that underlies the subarea, wherein different colors are assigned to different subareas to cause the different subareas to be visually distinctive from one another;
causing the weighted, centroidal Voronoi treemap to be displayed on a display screen of the computing device; and
dynamically updating the weighted, centroidal Voronoi treemap based at least in part upon receiving at least one of:
  an indication that at least a portion of the Voronoi treemap is desirably viewed in an altered view space; or
  an alteration in data in the tree-structured dataset, wherein the alteration in data causes a desired size of at least one subarea in the Voronoi treemap to alter.

20. The programmable processing unit of claim 19, wherein the programmable processing unit is a graphical processing unit, and wherein the plurality of subareas of the weighted, centroidal Voronoi treemap is computed in parallel.

* * * * *